(12) United States Patent
Betker et al.

(10) Patent No.: US 7,388,861 B2
(45) Date of Patent: *Jun. 17, 2008

(54) METHOD AND SYSTEM FOR PRIMARY BLADE SELECTION IN A MULTI-MODULE FIBRE CHANNEL SWITCH

(75) Inventors: Steven Manning Betker, Shoreview, MN (US); Timothy Vitters, Bloomington, MN (US); Renae M. Weber, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/608,634

(22) Filed: Dec. 8, 2006

(65) Prior Publication Data

US 2007/0081527 A1    Apr. 12, 2007

Related U.S. Application Data

(63) Continuation of application No. 10/200,487, filed on Jul. 22, 2002, now Pat. No. 7,154,886.

(51) Int. Cl.
*H04L 12/24* (2006.01)
(52) U.S. Cl. ..................... 370/386; 370/426
(58) Field of Classification Search ............. 370/360, 370/386, 426
See application file for complete search history.

(56) References Cited

U.S. PATENT DOCUMENTS 4,081,612 A    3/1978  Hafner
4,162,375 A    7/1979  Schilichte
4,200,929 A    4/1980  Davidjuk et al.
4,268,906 A    5/1981  Bourke et al.
4,333,143 A    6/1982  Calder
4,382,159 A    5/1983  Bowditch
4,425,640 A    1/1984  Philip et al.
4,449,182 A    5/1984  Rubinson et al.
4,546,468 A    10/1985 Christmas et al.

(Continued)

FOREIGN PATENT DOCUMENTS

EP    0649098    4/1995

(Continued)

OTHER PUBLICATIONS

"Office Action from USPTO dated Mar. 21, 2006 for U.S. Appl. No. 10/889,588".

(Continued)

*Primary Examiner*—Melvin Marcelo
(74) *Attorney, Agent, or Firm*—Klein, O'Neill & Singh, LLP

(57) ABSTRACT

A system and method for selecting a primary blade in a multi-module fibre channel switch with plural blades is provided. The system includes a state machine for sending exchangeable blade parameter(s) ("EBP") to the plural blades; and determining if a primary blade flag is set. If the primary blade flag is set, selecting the blade with the EBP priority number. If the primary blade flag is not selected, then selecting a blade with an EBP priority number if the EBP priority number is less than a retained priority number.

9 Claims, 4 Drawing Sheets

U.S. PATENT DOCUMENTS

| | | |
|---|---|---|
| 4,549,263 A | 10/1985 | Calder |
| 4,569,043 A | 2/1986 | Simmons et al. |
| 4,725,835 A | 2/1988 | Schreiner et al. |
| 4,777,595 A | 10/1988 | Strecker et al. |
| 4,783,730 A | 11/1988 | Fischer et al. |
| 4,783,739 A | 11/1988 | Calder |
| 4,803,622 A | 2/1989 | Bain, Jr. et al. |
| 4,821,034 A | 4/1989 | Anderson et al. |
| 4,980,857 A | 12/1990 | Walter et al. |
| 5,051,742 A | 9/1991 | Hullett et al. |
| 5,090,011 A | 2/1992 | Fukuta et al. |
| 5,115,430 A | 5/1992 | Hahne et al. |
| 5,129,064 A | 7/1992 | Fogg, Jr. et al. |
| 5,144,622 A | 9/1992 | Takiyasu et al. |
| 5,212,795 A | 5/1993 | Hendry |
| 5,249,279 A | 9/1993 | Schmenk et al. |
| 5,260,933 A | 11/1993 | Rouse |
| 5,276,807 A | 1/1994 | Kodama et al. |
| 5,321,816 A | 6/1994 | Rogan et al. |
| 5,339,311 A | 8/1994 | Turner |
| 5,347,638 A | 9/1994 | Desai et al. |
| 5,367,520 A | 11/1994 | Cordell |
| 5,371,861 A | 12/1994 | Keener et al. |
| 5,390,173 A | 2/1995 | Spinney et al. |
| 5,448,702 A | 9/1995 | Garcia, Jr. et al. |
| 5,568,165 A | 10/1996 | Kimura |
| 5,568,614 A | 10/1996 | Mendelson et al. |
| 5,590,125 A | 12/1996 | Acampora et al. |
| 5,598,541 A | 1/1997 | Malladi et al. |
| 5,610,745 A | 3/1997 | Bennett |
| 5,623,492 A | 4/1997 | Teraslinna |
| 5,647,057 A | 7/1997 | Roden et al. |
| 5,666,483 A | 9/1997 | McClary |
| 5,671,365 A | 9/1997 | Binford et al. |
| 5,687,172 A | 11/1997 | Cloonan et al. |
| 5,701,416 A | 12/1997 | Thorson et al. |
| 5,706,279 A | 1/1998 | Teraslinna |
| 5,740,467 A | 4/1998 | Chmielecki et al. |
| 5,748,612 A | 5/1998 | Stoevhase et al. |
| 5,758,187 A | 5/1998 | Young |
| 5,761,427 A | 6/1998 | Shah et al. |
| 5,790,840 A | 8/1998 | Bulka et al. |
| 5,812,525 A | 9/1998 | Teraslinna |
| 5,818,842 A | 10/1998 | Burwell et al. |
| 5,821,875 A | 10/1998 | Lee et al. |
| 5,825,748 A | 10/1998 | Barkey et al. |
| 5,828,475 A | 10/1998 | Bennett et al. |
| 5,828,903 A | 10/1998 | Sethuram et al. |
| 5,835,752 A | 11/1998 | Chiang et al. |
| 5,850,386 A | 12/1998 | Anderson et al. |
| 5,875,343 A | 2/1999 | Binford et al. |
| 5,881,296 A | 3/1999 | Williams et al. |
| 5,892,969 A | 4/1999 | Young |
| 5,894,560 A | 4/1999 | Carmichael et al. |
| 5,905,905 A | 5/1999 | Dailey et al. |
| 5,917,723 A | 6/1999 | Binford |
| 5,937,169 A | 8/1999 | Connery et al. |
| 5,954,796 A | 9/1999 | McCarty et al. |
| 5,968,143 A | 10/1999 | Chisholm et al. |
| 5,978,359 A | 11/1999 | Caldara et al. |
| 5,978,379 A | 11/1999 | Chan et al. |
| 5,983,292 A | 11/1999 | Nordstrom et al. |
| 5,987,028 A | 11/1999 | Yang et al. |
| 5,999,528 A | 12/1999 | Chow et al. |
| 6,006,340 A | 12/1999 | O'Connell |
| 6,014,383 A | 1/2000 | McCarty |
| 6,021,128 A | 2/2000 | Hosoya et al. |
| 6,026,092 A | 2/2000 | Abu-Amara et al. |
| 6,031,842 A | 2/2000 | Trevitt et al. |
| 6,047,323 A | 4/2000 | Krause |
| 6,049,802 A | 4/2000 | Waggener, Jr. et al. |
| 6,055,603 A | 4/2000 | Ofer et al. |
| 6,055,618 A | 4/2000 | Thorson |
| 6,061,360 A | 5/2000 | Miller et al. |
| 6,078,970 A | 6/2000 | Nordstrom |
| 6,081,512 A | 6/2000 | Muller et al. |
| 6,085,277 A | 7/2000 | Nordstrom et al. |
| 6,108,738 A | 8/2000 | Chambers et al. |
| 6,108,778 A | 8/2000 | LaBerge |
| 6,115,761 A | 9/2000 | Daniel et al. |
| 6,118,776 A | 9/2000 | Berman |
| 6,128,292 A | 10/2000 | Kim et al. |
| 6,138,176 A | 10/2000 | McDonald et al. |
| 6,144,668 A | 11/2000 | Bass et al. |
| 6,160,813 A | 12/2000 | Banks et al. |
| 6,185,620 B1 | 2/2001 | Weber et al. |
| 6,201,787 B1 | 3/2001 | Baldwin et al. |
| 6,229,822 B1 | 5/2001 | Chow et al. |
| 6,233,244 B1 | 5/2001 | Runaldue et al. |
| 6,240,096 B1 | 5/2001 | Book |
| 6,246,683 B1 | 6/2001 | Connery et al. |
| 6,247,060 B1 | 6/2001 | Boucher et al. |
| 6,252,891 B1 | 6/2001 | Perches |
| 6,253,267 B1 | 6/2001 | Kim et al. |
| 6,269,413 B1 | 7/2001 | Sherlock |
| 6,289,002 B1 | 9/2001 | Henson et al. |
| 6,308,220 B1 | 10/2001 | Mathur |
| 6,324,181 B1 | 11/2001 | Wong et al. |
| 6,330,236 B1 | 12/2001 | Ofek et al. |
| 6,334,153 B2 | 12/2001 | Boucher et al. |
| 6,343,324 B1 | 1/2002 | Hubis et al. |
| 6,353,612 B1 | 3/2002 | Zhu et al. |
| 6,370,605 B1 | 4/2002 | Chong |
| 6,389,479 B1 | 5/2002 | Boucher et al. |
| 6,393,487 B2 | 5/2002 | Boucher et al. |
| 6,401,128 B1 | 6/2002 | Stai et al. |
| 6,411,599 B1 | 6/2002 | Blanc et al. |
| 6,411,627 B1 | 6/2002 | Hullett et al. |
| 6,418,477 B1 | 7/2002 | Verma |
| 6,424,658 B1 | 7/2002 | Mathur |
| 6,427,171 B1 | 7/2002 | Craft et al. |
| 6,427,173 B1 | 7/2002 | Boucher et al. |
| 6,434,620 B1 | 8/2002 | Boucher et al. |
| 6,434,630 B1 | 8/2002 | Micalizzi, Jr. et al. |
| 6,449,274 B1 | 9/2002 | Holden et al. |
| 6,452,915 B1 | 9/2002 | Jorgensen |
| 6,457,090 B1 | 9/2002 | Young |
| 6,463,032 B1 | 10/2002 | Lau et al. |
| 6,467,008 B1 | 10/2002 | Gentry et al. |
| 6,470,026 B1 | 10/2002 | Pearson et al. |
| 6,470,173 B1 | 10/2002 | Okada et al. |
| 6,470,415 B1 | 10/2002 | Starr et al. |
| 6,502,189 B1 | 12/2002 | Westby |
| 6,504,846 B1 | 1/2003 | Yu et al. |
| 6,532,212 B1 | 3/2003 | Soloway et al. |
| 6,546,010 B1 | 4/2003 | Merchant et al. |
| 6,564,271 B2 | 5/2003 | Micalizzi et al. |
| 6,570,850 B1 | 5/2003 | Gutierrez et al. |
| 6,570,853 B1 | 5/2003 | Johnson et al. |
| 6,591,302 B2 | 7/2003 | Boucher et al. |
| 6,594,231 B1 | 7/2003 | Byham et al. |
| 6,597,691 B1 | 7/2003 | Anderson et al. |
| 6,597,777 B1 | 7/2003 | Ho |
| 6,614,796 B1 | 9/2003 | Black et al. |
| 6,657,962 B1 | 12/2003 | Barri et al. |
| 6,697,359 B1 | 2/2004 | George |
| 6,697,368 B2 | 2/2004 | Chang et al. |
| 6,718,497 B1 | 4/2004 | Whitby-Strevens |
| 6,721,799 B1 | 4/2004 | Slivkoff |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,775,693 B1 | 8/2004 | Adams |
| 6,785,241 B1 | 8/2004 | Lu et al. |

| | | |
|---|---|---|
| 6,807,181 B1 | 10/2004 | Weschler |
| 6,810,440 B2 | 10/2004 | Micalizzi, Jr. et al. |
| 6,810,442 B1 | 10/2004 | Lin |
| 6,816,492 B1 | 11/2004 | Turner et al. |
| 6,816,750 B1 | 11/2004 | Klaas |
| 6,859,435 B1 | 2/2005 | Lee et al. |
| 6,865,157 B1 | 3/2005 | Scott et al. |
| 6,886,141 B1 | 4/2005 | Kunz et al. |
| 6,941,357 B2 | 9/2005 | Nguyen et al. |
| 6,941,482 B2 | 9/2005 | Strong |
| 6,952,659 B2 | 10/2005 | King et al. |
| 6,968,463 B2 | 11/2005 | Pherson et al. |
| 7,000,025 B1 | 2/2006 | Wilson |
| 7,002,926 B1 | 2/2006 | Eneboe et al. |
| 7,010,607 B1 | 3/2006 | Bunton |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,092,374 B1 | 8/2006 | Gubbi |
| 7,110,394 B1 | 9/2006 | Chamdani et al. |
| 7,123,306 B1 | 10/2006 | Goto et al. |
| 7,124,169 B2 | 10/2006 | Shimozono et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,215,680 B2 | 5/2007 | Mullendore et al. |
| 7,221,650 B1 | 5/2007 | Cooper et al. |
| 7,245,613 B1 | 7/2007 | Winkles et al. |
| 7,248,580 B2 | 7/2007 | George et al. |
| 7,269,131 B2 | 9/2007 | Cashman et al. |
| 7,292,593 B1 | 11/2007 | Winkles et al. |
| 7,327,680 B1 | 2/2008 | Kloth |
| 2001/0011357 A1 | 8/2001 | Mori |
| 2001/0022823 A1 | 9/2001 | Renaud |
| 2001/0038628 A1 | 11/2001 | Ofek et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0191602 A1 | 12/2002 | Woodring et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0103451 A1 | 6/2003 | Lutgen et al. |
| 2003/0117961 A1 | 6/2003 | Chuah et al. |
| 2003/0120983 A1 | 6/2003 | Vieregge et al. |
| 2003/0126223 A1 | 7/2003 | Jenne et al. |
| 2003/0126320 A1 | 7/2003 | Liu et al. |
| 2003/0137941 A1 | 7/2003 | Kaushik et al. |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0218986 A1* | 11/2003 | DeSanti et al. ............. 370/250 |
| 2003/0229808 A1 | 12/2003 | Heintz et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0085994 A1 | 5/2004 | Warren et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George et al. |
| 2004/0151188 A1 | 8/2004 | Maveli et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0184711 A1 | 8/2006 | Pettey |
| 2006/0203725 A1 | 9/2006 | Paul et al. |
| 2007/0206502 A1 | 9/2007 | Martin et al. |

FOREIGN PATENT DOCUMENTS

| | | |
|---|---|---|
| EP | 0738978 | 10/1996 |
| EP | 0856969 | 8/1998 |
| EP | 1059588 | 12/2000 |
| WO | WO-95/06286 | 3/1995 |
| WO | WO-98/36537 | 8/1998 |
| WO | WO-0058843 | 10/2000 |
| WO | WO-03/088050 | 10/2003 |

OTHER PUBLICATIONS

"Office Action from USPTO dated Sep. 10, 2007 for U.S. Appl. No. 10/889,255".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 for U.S. Appl. No. 10/664,548".

"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
Malavalli, et al., "Fibre Channel Framing and Signaling (FC-FS) Rev 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Examination Report from the European Patent Office dated Oct. 12, 2007 for European Application No. 05 805 632.6".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Deliver Server-Free Backup", *Pathlight & Computer Associates*, White Paper of Apr. 2000, Ithaca, New York, XP-002381153, 1-8.
"Fibre Channel Generic Services—3 (FC-GS-3) Rev. 7.01, NCITS Working Draft Proposed American National Standard for Information Technology,", *T11/Project 1356 D/Rev 7.01*, (Nov. 28, 2000).

"Fibre Channel Switch Fabric—2(FC-SW-2) Rev 5.4 NCITS Working Draft Proposed American National Standard for Information Technology", *T11/Project 1305-D/Rev 5.4*, (Jun. 2001).
Banks, David C., et al., "Link Trunking and Measuring Link Latency in Fibre Channel Fabric", *U.S. Appl. No. 60/0286,046*, 1-52.
Brown, Douglas W., "A State-Machine Synthesizer", *18th Design Automation Conference*, (1981),301-305.
Clark, Tom , "Zoning for Fibre Channel Fabrics", *Vixel Corporation Paper-XP002185194*, (Aug. 1999), 1-6.
Curtis, A. R., "Design Considerations for 10-Gbit Fibre Channel", *Curtis A. Ridgeway, Distinguished I/O Architect, Storage and Computing ASIC's Division, LSI Logic Corp*.
Desanti, "Virtual Fabrics", *Virtual Fabrics, T11/03-352v0*, (May 2003),1-4.
Desanti, Claudio , "Virtual Fabrics Switch Suppport", *VF Switch Support, T11/04-395v2*, (Sep. 2004), 1-15.
Malavalli, Kumar , "Distributed Computing with Fibre Channel Fabric", *Proc. of the Computer Soc. Int'l Conf., Los Alamitos, IEEE Comp. Soc. Press., Vol. Conf. 37, XP000340745*, (Feb. 24, 1992),269-274.
Malavalli, Kumar , "High Speed Fibre Channel Switching Fabric Services", *Proceedings of the SPIE, SPIE, Bellingham, VA, USA vol. 1577,, XP000562869, ISSN: 0277-786X*,(Sep. 4, 1991),216-226.
Martin, Charles R., "Fabric Interconnection of Fibre Channel Standard Nodes", *Proceedings of the SPIE*, (Sep. 8, 1992), 65-71.
Martin, "Virtual Channel Architecture", *Presentation By Brocade to T11/03-369V0*, (00/02/2003).
Melhem, et al., "Minimizing Wavelength Conversions in WDM Path Establishment", *Computer Science Department, University of Pittsburgh, Pittsburgh, PA 15260*, (2001),197-211.
Naik, D. , "Inside Windows Storage:Server Storage Technologies for Windows 2000, Windows Server 2003 and Beyond", *Addison-Wesley, US, Chapter 5, XP-002381152*, (Jul. 15, 2003), 137-173.
Pelissier, "Inter-Fabric Routing", *Inter Fabric Routing (04-520v0)*, (Jul. 30, 2004), 1-31.
Ridgeway, Curt , "OGFC-40GFC using 4-lane XAUI's", *LSI Logic Presentation—T11/03-069v0*.
Yoshida, Hu , "Lun Security Considerations for Storage Area Networks", *Hitachi Data Systems Paper—XP.002185193 (1999)*, 1-4.
"Office Action from USPTO dated Mar. 5, 2008 for U.S. Appl. No. 10/889,259".
"Office Action from USPTO dated Mar. 7, 2008 for U.S. Appl. No. 10/894,629".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Dec. 7, 2007 for U.S. Appl. No. 10/961,463".
"Notice of Allowance from USPTO dated Jan. 8, 2008 for U.S. Appl. No. 10/889,551".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Office Action from USPTO dated Jan. 9, 2008 for U.S. Appl. No. 10/798,468".
"Office Action from USPTO dated Mar. 20, 2008 for U.S. Appl. No. 10/894,732".

* cited by examiner

METHOD AND SYSTEM FOR PRIMARY BLADE SELECTION IN A MULTI-MODULE FIBRE CHANNEL SWITCH

CROSS REFERENCE TO RELATED APPLICATION

This application is a continuation of application Ser. No. 10/200,487 filed Jul. 2, 2002, now U.S. Pat. No. 7,154,886 the disclosure of which is incorporated herein by reference. This application is related to U.S. patent Application entitled "METHOD AND SYSTEM FOR DYNAMICALLY ASSIGNING DOMAIN IDENTIFICATION IN A MULTI-MODULE FIBRE CHANNEL SWITCH", U.S. Ser. No.10/200,393, having common inventors and Assignee, filed on Jul. 22, 2002, the disclosure of which is incorporated herein by reference in its' entirety.

BACKGROUND

1. Field of the Invention

The present invention relates to networking systems, and more particularly to systems using fibre channel fabrics for interconnecting fibre channel devices.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel a path is established between two nodes where the path's primary task is to transport data from one point to another at high speed with low latency, performing only simple error detection in hardware. The fibre channel switch provides circuit/packet switched topology by establishing multiple simultaneous point-to-point connections.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives a message from one port and automatically routes it to another port. Multiple calls or data transfers happen concurrently through the multi-port fibre channel switch.

Fibre channel switches may use multiple modules (also referred to as "blades") connected by fibre channel ports. Conventionally, a multi-module switch is integrated as a single switch and appears to other devices in the fibre channel fabric as a single switch.

Conventional systems do not have an efficient way to select a primary blade so that a multi-module switch appears as a single switch.

Therefore, what is required is a process and system that efficiently selects a primary blade in a multi-module switch environment so that a multi-module switch appears as a single switch to other devices.

SUMMARY OF THE INVENTION

In one aspect, the present invention solves the foregoing drawbacks by providing a method for selecting a primary blade in a multi-module fibre channel switch with plural blades. The method includes sending exchangeable blade parameter(s) ("EBP") to plural blades; and determining if a primary blade flag is set. If the primary blade flag is set, selecting the blade with the EBP priority number and blade slot number. If the primary blade flag is not selected, then selecting a blade with an EBP priority number less than a retained EBP priority number.

In yet another aspect, the method according to the present invention includes selecting a blade with an EBP priority number equal to the retained priority number and a EBP slot number less than a retained primary blade slot number. Thereafter the process sends EBPs to all blades notifying plural blades of the selected primary blade.

In yet another aspect, a method for selecting a primary blade in a multi-module fibre channel switch with plural blades is provided. The method includes intializing plural blade internal ports; starting a timer; sending EBPs to plural blades; selecting a primary blade; and notifying all blades regarding the selected primary blade.

In yet another aspect of the present invention, a system for selecting a primary blade in a multi-module fibre channel switch with plural blades is provided. The system includes a state machine for sending exchangeable blade parameter(s) ("EBP") to the plural blades; and determining if a primary blade flag is set. If the primary blade flag is set, selecting the blade with the EBP priority number and blade slot number. If the primary blade flag is not selected, then the state machine selects a blade with an EBP priority number less than a retained EBP priority number.

In another aspect, the state machine selects a blade with an EBP priority number equal to the retained priority number and an EBP slot number is less than a retained primary blade slot number.

The state machine also sends EBPs to plural blades notifying the blades of the selected primary blade.

In yet another aspect, a system for selecting a primary blade in a multi module fibre channel switch with plural blades is provided. The system includes a state machine for intializing plural blade internal ports; starting a timer; sending EBPs to plural blades; selecting a primary blade; and notifying all blades regarding the selected primary blade.

In one aspect of the present invention, an efficient process for selecting a primary blade is provided so that the multiple modules in a fibre channel switch are able to self-configure to appear as a single switch, without user configuration or intervention. The foregoing process functions even if not all the modules are present, or if some of the internal ports linking modules have failed, as long as connectivity exists internally between the modules.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment of a disk drive. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"Blade": A module in a fibre channel switch.

"Blade_Id": A unique identifier for identifying a switch module.

"B_S_TOV Timer": A timer to detect inactivity during primary blade selection.

"EBP": Exchange Blade Parameters, created by Multi-Blade Protocol

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

Multi Blade protocol: A protocol that operates on internal switch module ports to assign a primary blade.

Port: A general reference to N. Sub.-- Port or F.Sub.-- Port.

"Slot Number": A unique identifier for each blade in a multi-module switch derived from the physical location of the blade in a chasis.

The Fibre Channel Specification used to build one embodiment of the present invention includes:

FC-SW-2 standard as published by the American National Standard Institute.

To facilitate an understanding of the preferred embodiment, the general architecture and operation of a fibre channel system will be described. The specific architecture and operation of the preferred embodiment will then be described with reference to the general architecture of the fibre channel system.

Figure 1:
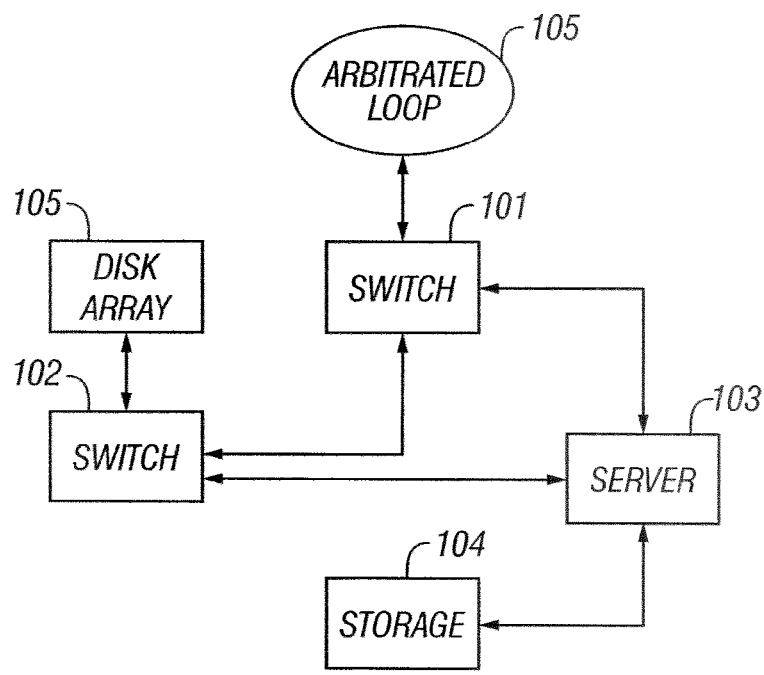
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL;Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An inter-switch link ("ISL") enables N_Ports to operationally couple to other N-Ports in a fabric.

Figure 2:
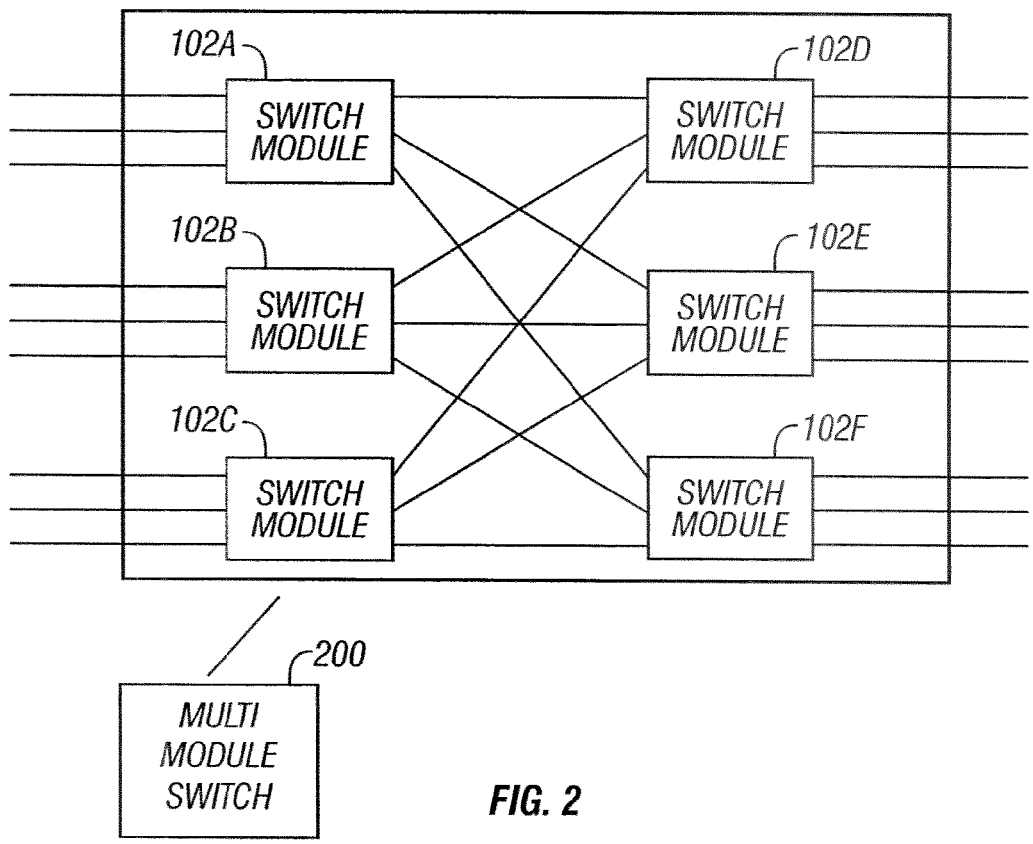
FIG. 2 is a block diagram showing mutli-module switch.

FIG. 2 is a block diagram that shows plural switch modules (or blades) 102A-102F (or 103) integrated into a single multi-module switch 200. Internal ports between the switch modules operate on a multi-blade protocol, while external ports operate under FC-SW-2 protocol. Because of the executable process steps described below, one of the switch modules out of 102A-102F operates as a primary blade so that to other devices in fibre channel system 100, switch module 200 appears as a single switch.

Figure 3:
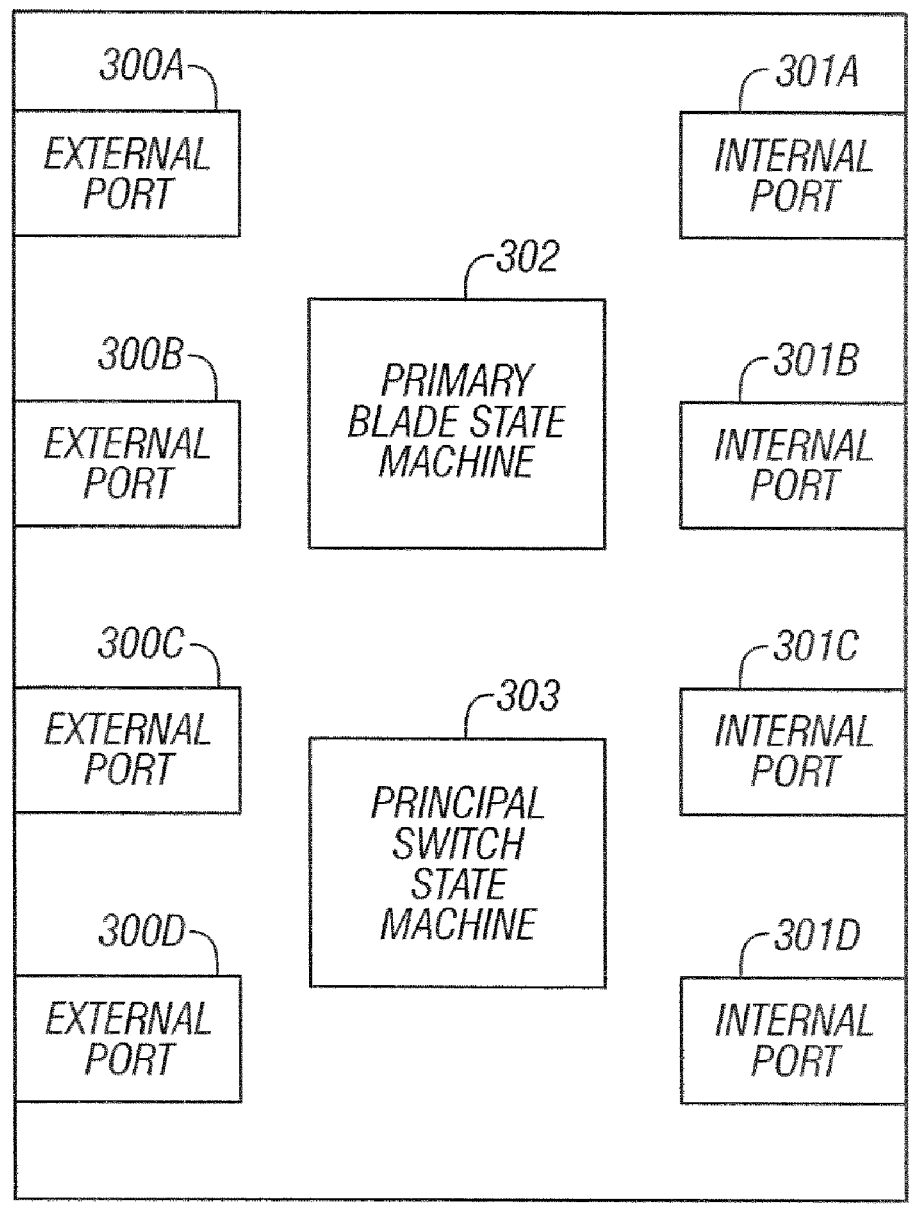
FIG. 3 is block diagram of a switch module in a multi-module switch environment that can select a primary blade, according to one aspect of the present invention.

FIG. 3 is a block diagram of a blade in a multi-module switch, e.g. blade 102A, that implements the adaptive aspects of the present invention. Switch module 102A includes plural external ports (F_Ports operationally coupled to other devices, e.g. server 103; or E_Ports coupled to other switch modules) 300A through 300D; and internal ports 301A-301D that operate under the multi-blade protocol.

Blade 102A also includes a primary blade state machine 302 that uses EBPs under the multi-blade protocol to select the primary blade module for module 200.

Figure 4:
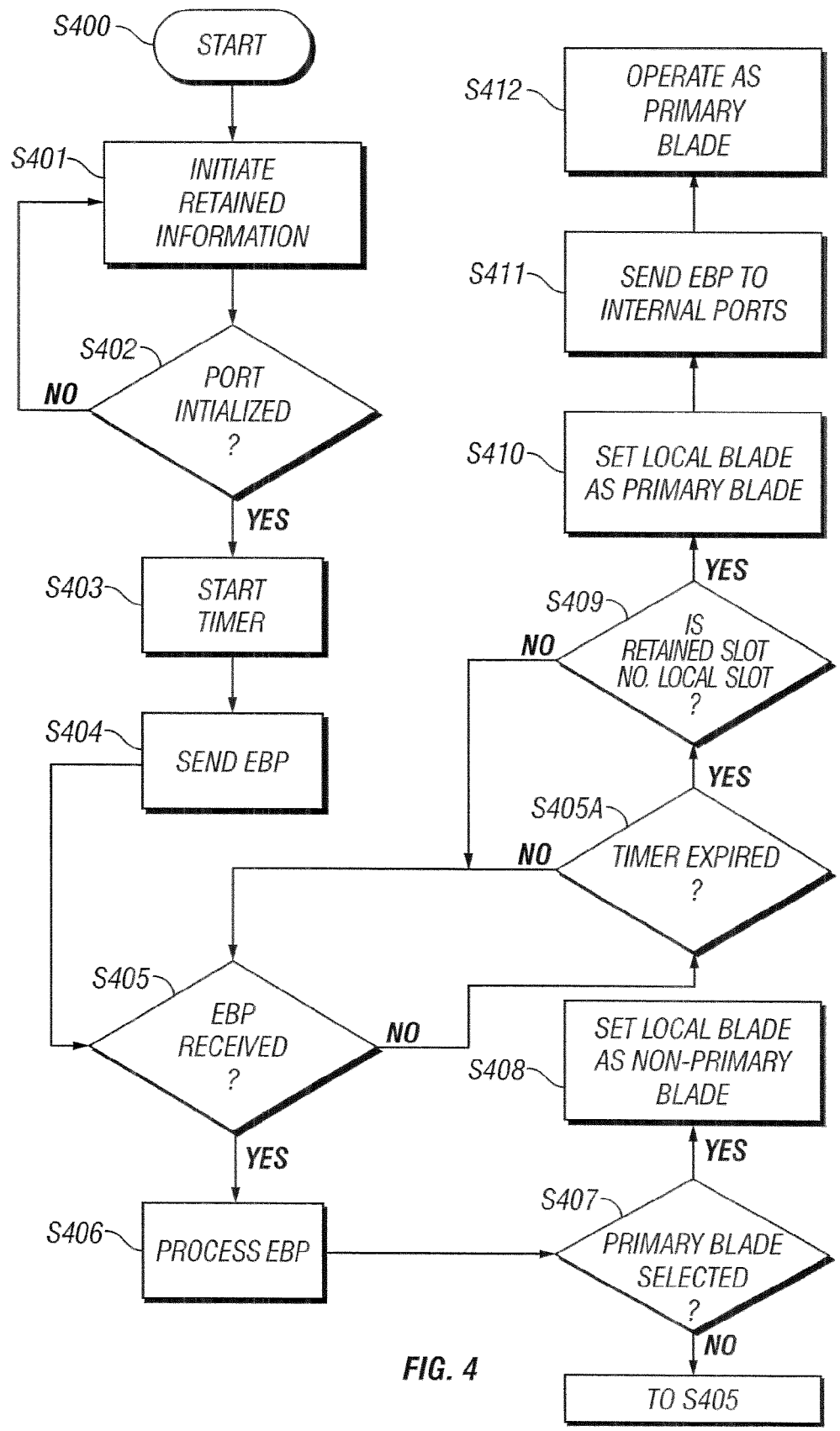
FIG. 4 is a process flow diagram of executable process steps for selecting a primary blade in a multi-module switch environment.

Also included in blade 102A is a principal switch state machine 303 that selects a principal switch from among plural multi-module switches Primary Blade Selection:

FIG. 4 shows a flow diagram of executable process steps for selecting a primary blade in a multi-module switch environment. In one aspect of the present invention EBP parameters are used to select a primary blade, and once a primary blade is selected other blades are notified of the primary blade selection. A blade with the lowest priority and slot number is selected as the primary blade. As defined above, a slot number is unique to a particular blade (or switch module, used interchangeably throughout this specification).

Turning in detail to FIG. 4, in step S400 the process starts and switch module 200 is initialized.

In step S401, retained primary blade priority and blade number is initialized to the blade's priority and blade number.

In step S402, internal ports 301A-301D are initialized.

In step S403, a B_S-TOV timer is started and thereafter, in steps S404, an EBP request is sent to all adjacent blades. In one aspect the B_S_TOV timer (not shown) is operationally coupled or integrated with state machine 302.

An example of an EBP request is provided below:

TABLE 1

EBP Request Payload

| Item | Byte Size |
|---|---|
| Command Code = hex' 82' | 1 |
| Reserved | 1 |
| Payload Length | 2 |
| Reserved | 3 |
| Primary Blade Priority | 1 |
| Reserved | 3 |
| Primary Blade Slot Number | 1 |
| Reserved | 3 |
| Primary Blade Assigned | 1 |
| Local Domain Id Status | 1 |
| Reserved | 2 |
| Local Domain Id | 1 |
| Reserved | 3 |
| Switch Priority | 1 |
| Design specific data | N |

Payload Length: This field may contain a 16-bit unsigned integer that specifies the total payload length in bytes. This value is hex'18'+size of design specific data.

Primary Blade Priority: This field specifies the priority level of a blade that an EBP transmitting blade believes is the primary blade.

Primary Blade Slot Number: This field specifies the slot number of the blade that the EBP transmitting blade believes is the primary blade. This value uniquely identifies each blade in a switch derived from the physical location of the module in a chassis.

Primary Blade Assigned: This field indicates that the primary blade role is assigned. If zeros the primary blade has not been selected. If non-zero, the primary blade has been selected. Table 2 below shows an example of primary blade values.

TABLE 2

Primary Blade Assigned Status

| value | Comments |
|---|---|
| 0 | Unassigned. Primary blade selection is in progress. |
| 1 | Assigned. Primary blade role assigned. |

In step S405, the process determines if all switch modules have received an EBP payload. If an EBP payload has been received, then the EBP is processed in step S406, as shown in the process steps of FIG. 5. If a primary blade has been selected, as determined in step S407, the local blade is set as a non-primary blade in step S408. If the primary blade has not been selected, then the process moves back to step S405.

If an EBP is not received in step s405, then in step S405A, the process determines, if the B_S_TOV timer has expired. If the timer has not expired the process moves to step s405.

If the timer has expired, then in step S409, the process determines if the retained slot number is the local slot number. If not, the process moves to step s405.

If the retained slot number is the local slot number, then in step S410, the local blade is set as the primary blade.

In step S411, the primary blade sends EBPs to all internal ports and the selected blade operates as the primary blade in step S412.

Figure 5:
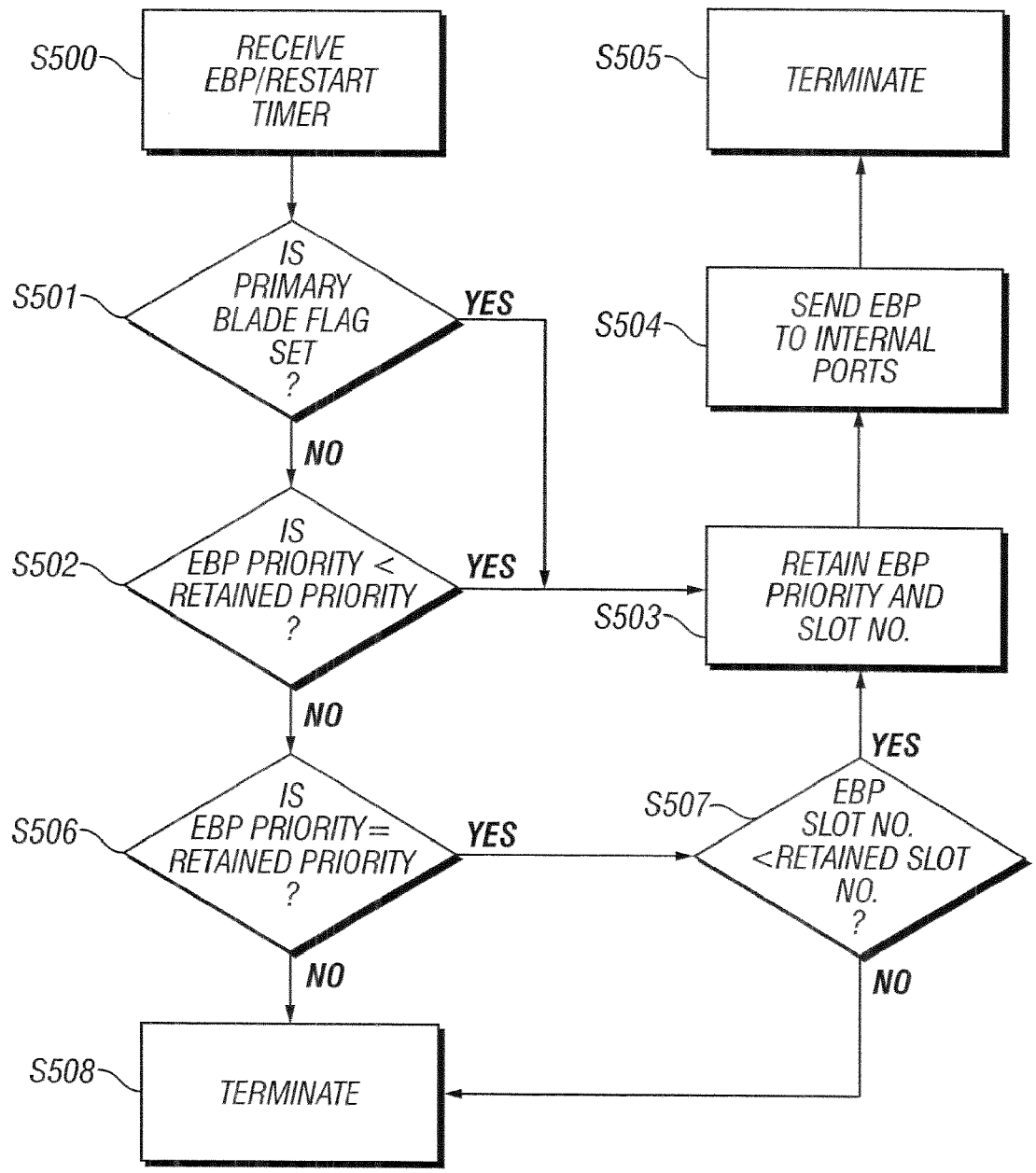
FIG. 5 is a flow diagram of a executable process steps for processing exchange blade parameters for selecting a primary blade, according to one aspect of the present invention.

FIG. 5 is a flow diagram of executable process steps that describes processing of EBPs (step S406) for selecting a primary blade, according to one aspect of the present invention.

Turning in detail to FIG. 5, in step S500, EBP's are received and the B_S_TOV timer is started.

In step S501, the EBP payload is analyzed by primary blade state machine 302, to determine whether a primary blade flag is set. If it is set, then the process moves to step S503, where the EBP priority and slot number replaces the retained priority and slot number.

If the primary blade flag is not set in step S501, then in step S502, the process determines if the EBP priority is less than the retained priority. If it is less, then the process moves to step S503.

If the EBP priority is not less than the retained priority, then in step S506, the process determines if the EBP priority is equal to the retained priority. If not, the process terminates at step S508.

If the EBP priority is equal to the retained priority, then in step S507, the process determines if the EBP slot number is less than the retained slot number. If it is less, then the process moves to step S503. If not, the process terminates at step S508.

Once the EBP priority and slot number are retained in step S503, in step S504 (similar to step S411), EBPs are sent to all internal ports with the selected primary blade and the process terminates in step S505.

In one aspect of the present invention, an efficient process for selecting a primary blade is provided so that the multiple modules in a fibre channel switch are able to self-configure to appear as a single switch, without user configuration or intervention. The foregoing process functions even if not all the modules are present, or if some of the internal ports linking modules have failed, as long as connectivity exists internally between the modules.

Although the present invention has been described with reference to specific embodiments, these embodiments are illustrative only and not limiting. Many other applications and embodiments of the present invention will be apparent in light of this disclosure and the following claims.

What is claimed is:

1. A method for a multi-module switch, comprising:
   selecting a primary blade from among a plurality of blades by sending exchangeable blade parameter(s) ("EBP") to the plural blades; and
   notifying at least another blade of primary blade selection, wherein the method for selecting the primary blade, comprises:
   determining if a primary blade flag is set in an EBP payload; and
   selecting a blade with a EBP priority and a blade slot number if the primary blade flag is selected.

2. The method of claim 1, further comprising:
selecting a blade with an EBP priority number if the EBP priority number is less than a retained priority number and the primary blade flag is un-selected.
3. The method of claim 1, further comprising:
selecting a blade with an EBP priority number equal to a retained priority number and an EBP slot number is less than a retained primary blade slot number.
4. The method of claim 1, further comprising:
sending EBPs to plural blades notifying the blades of a selected primary blade.
5. A system for selecting a primary blade in a multi-module fibre channel switch with plural blades, comprising;
a port for sending exchangeable blade parameter(s) ("EBP") to the plural blades; and determining if a primary blade flag is set in an EBP payload.
6. The system of claim 5, wherein the port selects a blade with an EBP priority and a blade slot number if the primary blade flag is selected.
7. The system of claim 5, wherein a blade is selected if the blade has an EBP priority number and the EBP priority number is less than a retained priority number and the primary blade flag is un-selected.
8. The system of claim 5, wherein a blade is selected if the blade has an EBP priority number equal to a retained priority number and an EBP slot number is less than a retained primary blade slot number.
9. The system of claim 5, wherein the port sends EBPs to the plural blades notifying the blades of the selected primary blade.

* * * * *

UNITED STATES PATENT AND TRADEMARK OFFICE
CERTIFICATE OF CORRECTION

PATENT NO. : 7,388,861 B2 Page 1 of 1
APPLICATION NO. : 11/608634
DATED : June 17, 2008
INVENTOR(S) : Steven Manning Betker et al.

It is certified that error appears in the above-identified patent and that said Letters Patent is hereby corrected as shown below:

On the title page, item (75), in column 1, in "Inventors", line 2, delete "Timothy Vitters," and insert -- Timothy R. Vitters, --, therefor.

In column 1, line 9, delete "Jul. 2, 2002," and insert -- Jul. 22, 2002, --, therefor.

In column 5, line 47, delete "zeros" and insert -- zero, --, therefor.

In column 6, line 66, in claim 1, delete "a EBP" and insert -- an EBP --, therefor.

Signed and Sealed this

Sixteenth Day of November, 2010

David J. Kappos
*Director of the United States Patent and Trademark Office*